(12) United States Patent
Xiao et al.

(10) Patent No.: US 11,841,530 B2
(45) Date of Patent: Dec. 12, 2023

(54) HIGH-BANDWIDTH BEND-INSENSITIVE MULTIMODE FIBER

(71) Applicant: YANGTZE OPTICAL FIBRE AND CABLE JOINT STOCK LIMITED COMPANY, Hubei (CN)

(72) Inventors: Wufeng Xiao, Hubei (CN); Rong Huang, Hubei (CN); Haiying Wang, Hubei (CN); Runhan Wang, Hubei (CN); Honghai Wang, Hubei (CN); Ruichun Wang, Hubei (CN)

(73) Assignee: YANGTZE OPTICAL FIBRE AND CABLE JOINT STOCK LIMITED COMPANY, Hubei (CN)

( * ) Notice: Subject to any disclaimer, the term of this patent is extended or adjusted under 35 U.S.C. 154(b) by 472 days.

(21) Appl. No.: 17/047,808

(22) PCT Filed: Apr. 11, 2019

(86) PCT No.: PCT/CN2019/082239
§ 371 (c)(1),
(2) Date: Oct. 15, 2020

(87) PCT Pub. No.: WO2019/201147
PCT Pub. Date: Oct. 24, 2019

(65) Prior Publication Data
US 2021/0165159 A1 Jun. 3, 2021

(30) Foreign Application Priority Data
Apr. 17, 2018 (CN) .......................... 201810344821.5

(51) Int. Cl.
*G02B 6/028* (2006.01)
*G02B 6/036* (2006.01)

(52) U.S. Cl.
CPC ......... *G02B 6/0288* (2013.01); *G02B 6/0365* (2013.01)

(58) Field of Classification Search
None
See application file for complete search history.

(56) References Cited

U.S. PATENT DOCUMENTS

2007/0065084 A1    3/2007   Prasad et al.

FOREIGN PATENT DOCUMENTS

| CN | 1945364 A | 4/2007 |
| CN | 102396119 A | 3/2012 |

(Continued)

OTHER PUBLICATIONS

State Intellectual Property Office of People's Republic of China, "International Search Report for PCT Application No. PCT/CN2019/082239", China, dated Jul. 1, 2019.

*Primary Examiner* — Chris H Chu
(74) *Attorney, Agent, or Firm* — Tim Tingkang Xia, Esq.; Locke Lord LLP

(57) ABSTRACT

A high-bandwidth bend-insensitive multimode fiber includes a core layer and a cladding including an inner cladding, a depressed cladding, and an outer cladding arranged sequentially from inside to outside. The core layer is a silicon dioxide glass layer co-doped with germanium, phosphorus (P), and fluorine (F) and has a refractive index profile in a shape of a parabola, a distribution index in a range of 2.0-2.3, a radius in a range of 23-27 μm, and a maximum relative refractive index difference in a range of 0.9-1.2% at its center. A contribution amount of P at the center is in a range of 0.01-0.30%. A doping amount of F increases from the center to the edge of the core layer. A (Continued)

contribution amount of F at the center and edge of the core layer is in range of 0.0% to −0.1%, and −0.40% to −0.20%, respectively.

9 Claims, 2 Drawing Sheets

(56) References Cited

FOREIGN PATENT DOCUMENTS

| CN | 106383379 A |   | 2/2017 |               |
|----|-------------|---|--------|---------------|
| CN | 106707407 A | * | 5/2017 | ............... G02B 6/02 |
| CN | 106842419 A |   | 6/2017 |               |
| CN | 108375815 A |   | 8/2018 |               |
| JP | 2016145981 A | * | 8/2016 | ........... C03C 13/046 |
| WO | WO-2015092464 A1 | * | 6/2015 | ........... G02B 6/0281 |

* cited by examiner

HIGH-BANDWIDTH BEND-INSENSITIVE MULTIMODE FIBER

FIELD OF THE INVENTION

The present disclosure relates to a high-bandwidth bend-insensitive multimode fiber, and belongs to the technical field of optical communication.

BACKGROUND OF THE INVENTION

In accordance with the description of multimode fibers in fiber product specification and standards IEC 60793-2 provided by the International Electrotechnical Commission (IEC), category A1 fibers are multimode fibers, and the category A1 fibers are divided, according to geometric construction thereof, into category A1a fibers, category A1b fibers, and category A1d fibers. The category A1 fibers are fibers having a graded refractive index of 50/125 μm; the category A1b fibers are fibers having a graded refractive index of 62.5/125 μm; and the category A1d fibers are fibers having a graded refractive index of 100/140 μm. The category A1 fibers are currently the most widely used category of multimode fibers in commercial use, and are further divided, according to bandwidth performance in an ascending order, into category A1a.1 fibers, category A1a.2 fibers, and category A1a.3 fibers, which respectively correspond to cabled fiber types OM2, OM3, and OM4 in the ISO/IEC standard.

Multimode fibers have become a high-quality solution for short-distance high-speed transmission networks due to its advantage of low system cost, and they have been widely used in data centers, office centers, high-performance computing centers, storage area networks and so on. Application scenarios of the multimode fibers are often integrated systems such as narrow cabinets and distribution boxes in which the fibers will have small bending radiuses. When a conventional multimode fiber is bent at a small radius, high-order modes transmitted near an edge of a fiber core can easily leak out, thereby causing signal loss. In designing a refractive index profile of a bend-insensitive multimode fiber, a low refractive index area can be added in a fiber cladding to limit leakage of the high-order modes so as to minimize the signal loss. Due to their excellent bending insensitivity, bend-insensitive multimode fibers are efficiently applied in data center local area networks.

Intermodal dispersion in a multimode fiber greatly limits a transmission distance that can be supported by the multimode fiber. In order to reduce the intermodal dispersion in the fiber, a refractive index profile of a core layer of the multimode fiber needs to be designed to have a refractive index distribution in which the refractive index continuously and gradually decreases from a center to an edge of the core layer, and usually we call it the "α profile". That is, the refractive index distribution satisfies the following power exponential function:

$$n^2(r) = n_1^2 \left[1 - 2\Delta_0 \left(\frac{r}{a}\right)^\alpha\right] r < a,$$

in which, $n_1$ is a refractive index at a fiber axis; r is a distance from the fiber axis; a is a radius of a fiber core; α is a distribution index; and $\Delta_0$ is a refractive index at a center of the fiber core relative to the cladding.

A relative refractive index is $\Delta_i$:

$$\Delta_i \% = \left[(n_i^2 - n_0^2)/2n_i^2\right] \times 100\%,$$

in which, $n_i$ is a refractive index at a position which is in a distance of i from the center of the fiber core; and $n_0$ is a minimum refractive index of a fiber core layer, and is usually a refractive index of the fiber cladding.

The refractive index distribution of the core layer of the multimode fiber is realized by adding a dopant (such as $GeO_2$, F, $B_2O_3$, $P_2O_5$, $TiO_2$, $Al_2O_3$, $ZrO_2$, $SnO_2$) having a certain concentration and a refractive index adjustment function into $SiO_2$. The multimode fiber obtained by designing in this way can support high-speed transmission of hundreds of meters. For example, with a laser light source of 850 nm, a single OM4 multimode fiber can support transmission of Ethernet traffic at a speed of 10 Gb/s for more than 550 m, and support transmission at a speed of 40 Gb/s for more than 150 m. However, with the rapid development of the network transmission speed and the continuous increase of users' demands for the bandwidth, the capacity of the multimode fiber needs to be increased continuously. At present, the bandwidth of the single OM4 multimode fiber has approached an upper limit of a multimode fiber. In a single light source transmission system with a speed of 100 Gb/s, 400 Gb/s or an even higher speed, a transmission distance that the OM4 multimode fiber can support will be greatly shortened. The wavelength division multiplexing (WDM) technology is an effective means to further increase the capacity of the multimode fiber so as to adapt to a transmission system with a higher speed. By using the WDM, a single fiber can accommodate multiple data channels, and the transmission capacity of the fiber is increased every time a wavelength is added. For example, four wavelengths of 25 Gb/s are combined and transmitted through one multimode fiber, so that performance of transmission at a speed of 100 Gb/s for more than 150 m supported by a single multimode fiber can be realized. That is, the capacity of the single multimode fiber is increased to 4 times of the original. When the WDM technology is to be used in a multimode fiber, it is required that the fiber be capable of supporting high-performance transmission in multiple wavelength windows.

By precisely controlling the refractive index distribution of the core layer, the multimode fiber can achieve high bandwidth performance. The bandwidth performance herein refers to the over-filled launch bandwidth (OFL Bandwidth) of the fiber, which is measured by using the FOTP-204 standard test method specified in the TIA. Studies show that when the refractive index profile of the multimode fiber is constant, the multimode fiber tends to show higher bandwidth performance in a specific wavelength window only; and when a fiber application window is moved to a larger or smaller wavelength, the bandwidth performance would be significantly reduced. Therefore, from the application point of view, it is desirable to improve the design of the multimode fiber, so that the multimode fiber is compatible with the existing OM3/OM4 multimode fibers, has lower bandwidth-wavelength sensitivity so as to meet requirements of applying the WDM technology within a certain wavelength range, and can also have excellent bending insensitivity to meet new requirements for the multimode fiber with the advancement of the transmission technology.

In a conventional germanium-doped multimode fiber, germanium doping is performed at the core layer of the multimode fiber so that a refractive index profile similar to a parabola is formed, and a high bandwidth is realized by optimizing the value of α of the profile. However, due to higher chromatic dispersion of the germanium-doped core layer, the optimal value of α is sensitive to the operating wavelength of the light propagating in the fiber. Therefore, the bandwidth of the conventional multimode fiber is very sensitive to the fluctuation of the value of α of the core layer, and a slight deviation from the optimal value of α will result in a decrease in the bandwidth, which makes the high-bandwidth operating wavelength range of the conventional multimode fiber very narrow. In addition, since germanium is a metal atom with a relatively large radius, a relatively high doping amount thereof can lead to great attenuation in the fiber. The wavelength division multiplexing technology requires that the fiber be capable of supporting high-performance transmission in multiple wavelength windows, and therefore the multimode fiber needs to be insensitive to the operating wavelength in a wider range so as to ensure that there is a larger high-bandwidth operating window. Compared with a core layer of the conventional multimode fiber that is doped with germanium only, a core layer doped with multiple components can have smaller chromatic dispersion by optimizing the types and the concentrations of doping components and the manner of doping, and thus can have a higher bandwidth in a wider range.

SUMMARY OF THE INVENTION

To facilitate description of the present disclosure, some terms used in this text are defined as follows.

core rod: a preformed member including a core layer and part of a cladding;

radius: a distance from an outer edge of a layer to a center point of the layer;

refractive index profile: reflecting a relationship between a glass refractive index of a fiber or a fiber preformed rod (including the core rod) and a radius thereof;

contribution amount of fluorine (F): a relative refractive index difference ($\Delta F$) of quartz glass doped with fluorine (F) relative to pure quartz glass, which is used to indicate a doping amount of fluorine (F);

contribution amount of germanium (Ge): a relative refractive index difference ($\Delta Ge$) of quartz glass doped with germanium (Ge) relative to pure quartz glass, which is used to indicate a doping amount of germanium (Ge); and contribution amount of phosphorus (P): a relative refractive index difference ($\Delta P$) of quartz glass doped with phosphorus (P) relative to pure quartz glass, which is used to indicate a doping amount of phosphorus (P).

Directed against the above deficiency in the existing technologies, the present disclosure aims to provide a high-bandwidth bend-insensitive multimode fiber which has reasonable material composition and structural design of a core layer and a cladding and is convenient for process control.

In order to achieve the above objective, the present disclosure adopts the following technical solutions. The high-bandwidth bend-insensitive multimode fiber includes a core layer and a cladding including an inner cladding, a depressed cladding, and an outer cladding arranged sequentially from inside to outside. The core layer has a refractive index profile in a shape of a parabola, a distribution index α in a range of 2.0 to 2.3, and a radius R1 in a range of 23 μm to 27 μm. A center of the core layer has a maximum relative refractive index difference $\Delta 1_{max}$ in a range of 0.9% to 1.2%. The core layer is a silicon dioxide glass layer co-doped with germanium (Ge), phosphorus (P), and fluorine (F). P and Ge are used as positive dopants. A contribution amount of P at the center of the core layer, i.e., $\Delta P0$, is in a range of 0.01% to 0.30%. A contribution amount of P at a boundary of the core layer and the inner cladding, i.e., $\Delta P1$, is in a range of 0.01% to 0.30%. A difference between the contribution amount of P at the center of the core layer and the contribution amount of P at an edge of the core layer is $\Delta P10$, and $$\Delta P10 = 2\left|\frac{\Delta P1 - \Delta P0}{\Delta P1 + \Delta P0}\right|;$$

$\Delta P10$ being less than or equal to 5%. The content of P at the center of the core layer is consistent with that at the edge of the core layer, i.e., a concentration difference between a concentration of P at the center of the core layer and a concentration of P at the edge of the core layer is kept as small as possible. F is used as a negative dopant in the core layer. A doping amount of F increases from the center of the core layer to the edge of the core layer. A contribution amount of F at the center of the core layer, i.e., $\Delta F0$, is in a range of 0.0% to −0.1%, and a contribution amount of F at the edge of the core layer, i.e., $\Delta F1$, is in a range of −0.40% to −0.20%.

According to the above solution, the inner cladding is a silicon dioxide glass layer co-doped with phosphorus (P) and fluorine (F). A contribution amount of F, i.e., $\Delta F2$, is in a range of −0.18% to −0.08%. A contribution amount of P at an outer edge of the inner cladding, i.e., $\Delta P2$, is in a range of 0% to 0.40%. A difference between the contribution amount of P at a boundary of the core layer and the inner cladding and the contribution amount of P at the outer edge of the inner cladding is $\Delta P21$, and $\Delta P21 = \Delta P2 - \Delta P1$, $\Delta P21$ being in a range of −0.3% to −0.01% or in a range of 0.01% to 0.20%.

According to the above solution, the inner cladding is divided into a platform area and a graded area according to variation of a concentration of P. The concentration of P in the platform region is substantially consistent, and then the concentration of P gradually increases or decreases. The platform area has a width T1 in a range of 0.1 μm to 2 μm, and the graded area has a width T2 in a range of 2 μm to 4 μm. The inner cladding has a width (R2−R1) in a range of 1.0 μm to 5.0 μm. The inner cladding has a relative refractive index difference $\Delta 2$, and $\Delta 2 = \Delta P2 + \Delta F2$, $\Delta F2$ of the platform area and the graded area ensuring that $\Delta 2$ is in a range of −0.09% to 0.09%.

According to the above solution, the depressed cladding has a width (R3−R2) in a range of 3.0 μm to 7.0 μm, and has a relative refractive index difference $\Delta 3$ in a range of −0.9% to −0.3%. The outer cladding is a pure silicon dioxide glass layer.

According to the above solution, both a DMD inner mask (5 μm to 18 μm) and a DMD outer mask (0 μm to 23 μm) of the fiber are less than or equal to 0.33 ps/m, and a DMD interval mask of the fiber is less than or equal to 0.25 ps/m. Preferably, both the DMD inner mask (5 μm to 18 μm) and the DMD outer mask (0 μm to 23 μm) of the fiber are less than or equal to 0.14 ps/m, and the DMD interval mask is less than or equal to 0.11 ps/m.

According to the above solution, the fiber has a numerical aperture in a range of 0.185 to 0.215.

According to the above solution, the fiber has a bandwidth of 3500 MHz-km or more than 3500 MHz-km at a wavelength of 850 nm, has a bandwidth of 2000 MHz-km or more than 2000 MHz-km at a wavelength of 950 nm, and has a bandwidth of 500 MHz-km or more than 500 MHz-km at a wavelength of 1300 nm.

Further, the fiber has a bandwidth of 5000 MHz-km or more than 5000 MHz-km at a wavelength of 850 nm, has a bandwidth of 3300 MHz-km or more than 3000 MHz-km at a wavelength of 950 nm, and has a bandwidth of 600 MHz-km or more than 600 MHz-km at a wavelength of 1300 nm.

According to the above solution, the fiber has an effective modal bandwidth (EMB) of 4700 MHz-km or more than 4700 MHz-km at a wavelength of 850 nm, has an effective modal bandwidth (EMB) of 3400 MHz-km or more than 3400 MHz-km at a wavelength of 875 nm, has an effective modal bandwidth (EMB) of 2900 MHz-km or more than 2900 MHz-km at a wavelength of 900 nm, has an effective modal bandwidth (EMB) of 2800 MHz-km or more than 2800 MHz-km at a wavelength of 925 nm, and has an effective modal bandwidth (EMB) of 2500 MHz-km or more than 2500 MHz-km at a wavelength of 950 nm.

According to the above solution, bending additional loss of the fiber at a wavelength of 850 nm caused by bending the fiber into two circles with a bending radius of 7.5 mm is less than 0.2 dB; and additional bending loss of the fiber at a wavelength of 1300 nm caused by bending the fiber into two circles with a bending radius of 7.5 mm is less than 0.5 dB.

The beneficial effects of the present disclosure lie in the following aspects. 1. The present disclosure realizes optimization of bandwidth performance of optical transmission by optimizing a doping amount of fluorine in the core layer, so that bandwidth-wavelength sensitivity is reduced while the bandwidth performance is improved. 2. The core layer of the fiber is co-doped by Ge, P, and F and has an increased concentration of phosphorus and a reduced concentration of germanium, which helps to improve a chromatic dispersion property of a material of the core layer and reduce chromatic dispersion so as to further improve the bandwidth performance and reduce attenuation in the fiber. 3. It is not easy to perform precision control on P by a flowmeter so as to form a precise refractive index profile, and P is volatile and diffuses easily. Accordingly, the concentration of P in the core layer is relatively constant, and a concentration difference thereof is very small, the concentration of P at the center and the concentration of P at the edge being substantially the same; and a graded refractive index of the core layer is achieved by performing precise control on Ge and F. 4. The inner cladding is divided into a platform area and a graded area according to doping of P. The platform area avoids deformation of the profile of the core layer resulting from diffusion of P caused by a concentration difference of P between two sides at the boundary of the core layer and the inner cladding. That is, a part of the cladding close to the core layer has the same concentration of P as the core layer, so as to avoid diffusion of P between the core layer and the cladding. The graded area is mainly formed by graded doping and diffusion of P. The graded area conforms to the Fick's Law, and doping of P may gradually increases or decreases. Gradually increased P in the graded area may also be used as an adjuvant for adjusting viscosity matching, so as to improve the viscosity matching between materials of the inner cladding and the depressed cladding. 5. The fiber of the present disclosure not only is compatible with an existing OM3/OM4 multimode fiber, but also can support the wavelength division multiplexing technology in a wavelength range of 850 nm to 950 nm. 6. The depressed cladding is designed with reasonable parameters, which improves bend-insensitivity performance of the fiber. 7. The fiber of the present disclosure has excellent bend-insensitivity performance, and is suitable for access networks and miniaturized optical devices. The present disclosure makes it possible to further improve the transmission capacity of the multimode fiber, which meets rapidly growing network demands for data traffic and is of great significance to application of the optical communication technology. 8. The manufacturing method of present disclosure is simple and convenient, and thus the present disclosure is suitable for large-scale production.

DETAILED DESCRIPTION OF THE EMBODIMENTS

Figure 1:
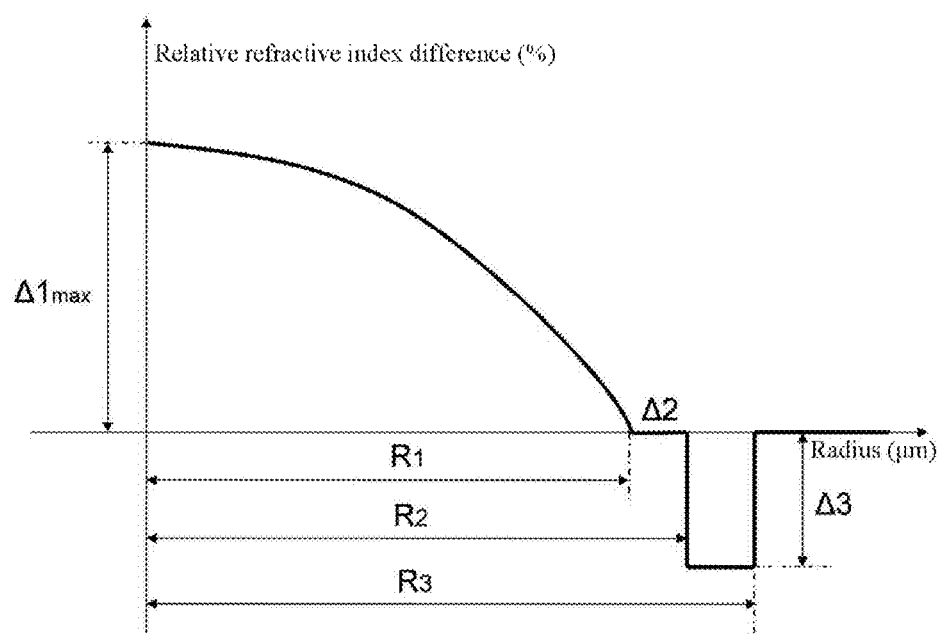
FIG. 1 schematically shows a refractive index profile according to an embodiment of the present disclosure.
Figure 2:
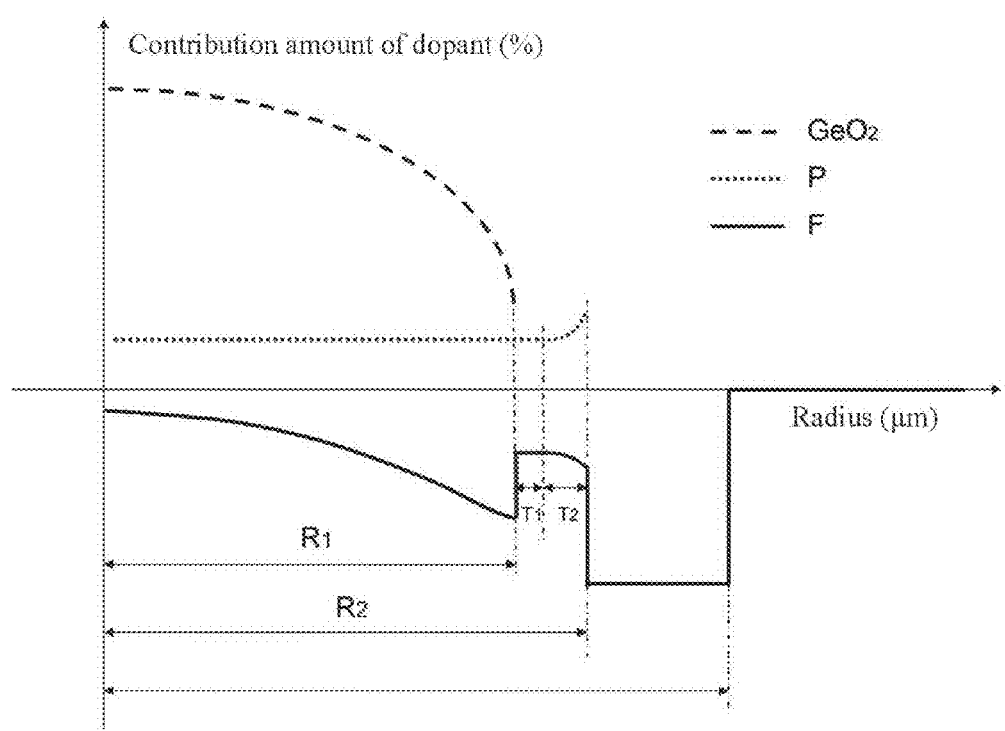
FIG. 2 schematically shows a doping amount profile according to an embodiment of the present disclosure.
Figure 3:
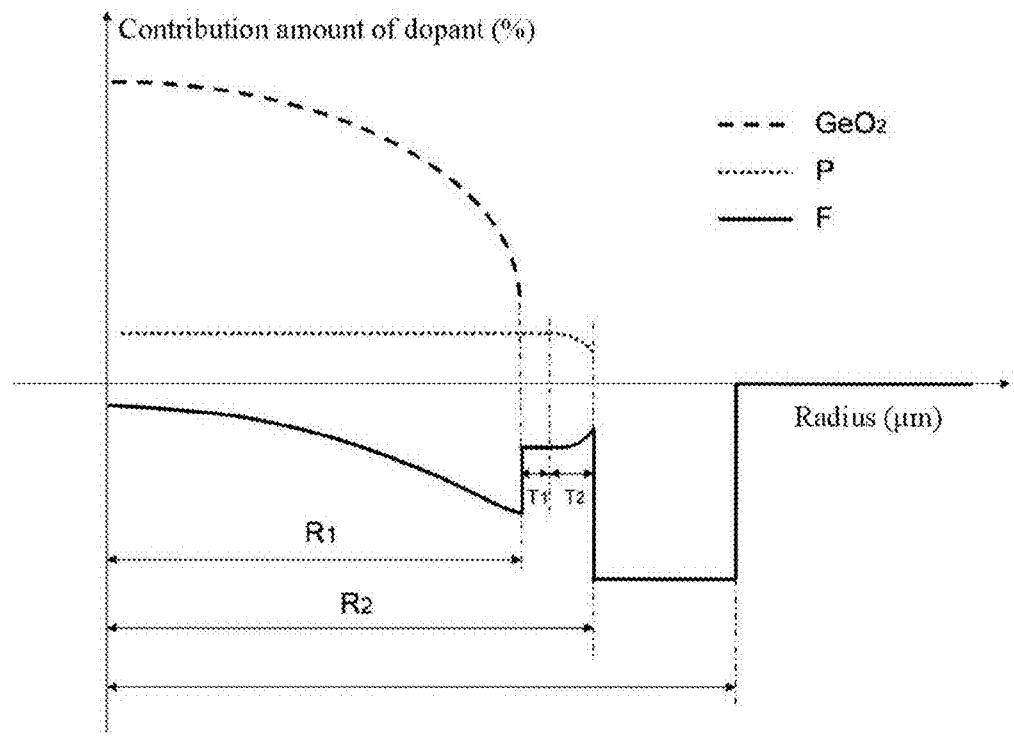
FIG. 3 schematically shows a doping amount profile according to another embodiment of the present disclosure.
Figure 4:
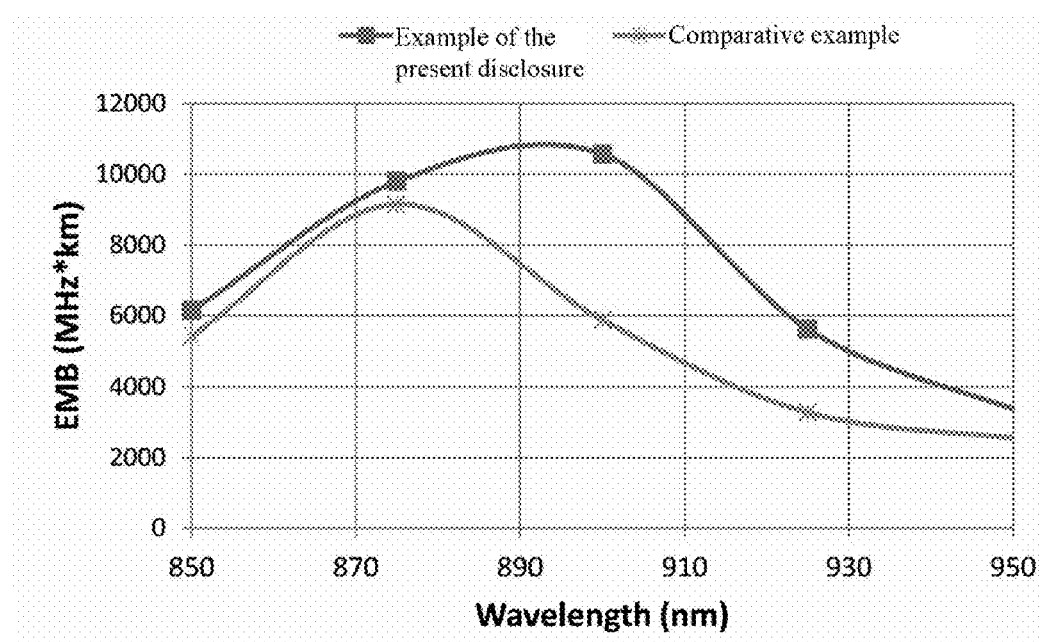
FIG. 4 shows distribution of effective modal bandwidths (EMB) with wavelengths of the high-bandwidth bend-insensitive multimode fiber described in the present disclosure and in a comparative example.

Specific embodiments will be provided below to further explain the present disclosure. The high-bandwidth bend-insensitive multimode fiber includes a core layer and a cladding including an inner cladding, a depressed cladding, and an outer cladding arranged sequentially from inside to outside. The core layer has a refractive index profile in a shape of a parabola, a distribution index $\alpha$, and a radius R1. A center of the core layer has a maximum relative refractive index difference $\Delta 1_{max}$ in a range of 0.9% to 1.2%. The core layer is a silicon dioxide glass layer co-doped with germanium (Ge), phosphorus (P), and fluorine (F). P and Ge are used as positive dopants. A contribution amount of P at the center of the core layer is $\Delta P0$. A contribution amount of P at a boundary between the core layer and the inner cladding is $\Delta P1$. A difference between the contribution amount of P at the center of the core layer and a contribution amount of P at an edge of the core layer is $\Delta P10$, and $$\Delta P10 = 2\left|\frac{\Delta P1 - \Delta P0}{\Delta P1 + \Delta P0}\right|.$$

A content of P at the center of the core layer is consistent with that at the edge of the core layer. That is, a concentration difference between a concentration of P at the center of the core layer and a concentration of P at the edge of the core layer is kept as small as possible. F is used in the core layer as a negative dopant. A doping amount of F increases from the center of the core layer to the edge of the core layer. A contribution amount of F at the center of the core layer is $\Delta F0$, and a contribution amount of F at the edge of the core layer is $\Delta F1$. The inner cladding is a silicon dioxide glass layer co-doped with phosphorus (P) and fluorine (F). A contribution amount of F in the inner cladding, i.e., $\Delta F2$, is in a range of −0.18% to −0.08%. A contribution amount of P at an outer edge of the inner cladding, i.e., $\Delta P2$, is in a range of 0% to 0.40%. A difference between the contribution amount of P at the boundary of the core layer and the inner cladding, i.e., an inner edge of the inner cladding, and the contribution amount of P at the outer edge of the inner cladding is $\Delta P21$, and $\Delta P21=\Delta P2-\Delta P1$. The inner cladding has a radius R2 and a relative refractive index difference $\Delta 2$. The depressed cladding has a radius R3 and a relative refractive index difference $\Delta 3$. The outer cladding is a pure silicon dioxide glass layer, and has a radius of 62.5 µm.

According to the description of present disclosure, a group of preformed rods were prepared and drawn into fibers, and two-layer coating of the multimode fiber was used. Main structural parameters and performance parameters of the fibers are shown in Table 1.

Macrobending additional loss was measured according to the method of FOTP-62 (IEC 60793-1-47). A fiber to be measured was bent into a circle with a certain diameter (for example, 10 mm, 15 mm, 20 mm, 30 mm, and so on), and was then released. A change between an optical power before the bending and an optical power after the bending was measured, and was used as the macrobending additional loss of the fiber. The measurement was conducted at an encircled flux launch condition. The encircled flux launch condition could be achieved by the following method. An ordinary multimode fiber having a length of 2 meters and a core diameter of 50 µm was fused to a leading end of the fiber to be measured, and the fiber to be measured was bent at a middle part thereof to form a circle having a diameter of 25 mm. When an over-filled launch light source flooded the fiber with light, an encircled flux launch condition was formed in the fiber to be measured.

The over-filled launch bandwidth was measured according to the method of FOTP-204 and at an over-filled launch condition.

TABLE 1

Main structural parameters and performance parameters of a fiber

| | | Embodiments | | | |
|---|---|---|---|---|---|
| | | 1 | 2 | 3 | 4 |
| Structural parameters of a fiber | α of the core layer | 2.06 | 2.08 | 2.03 | 2.08 |
| | Δ1max (%) | 1.16 | 1.18 | 1.18 | 1.09 |
| | Δ2 (%) | 0.06 | −0.07 | −0.08 | 0.05 |
| | Δ3 (%) | −0.45 | −0.48 | −0.56 | −0.60 |
| | ΔF0 (%) | −0.02 | −0.02 | −0.04 | −0.08 |
| | ΔF1 (%) | −0.28 | −0.32 | −0.25 | −0.36 |
| | ΔP0 (%) | 0.12 | 0.18 | 0.23 | 0.04 |
| | ΔP10 (%) | 3.2 | 0.5 | 1.4 | 2.0 |
| | ΔP21 (%) | −0.02 | 0.05 | −0.12 | 0.001 |
| | R1 (µm) | 24.9 | 24.7 | 25.1 | 25.3 |
| | R2 (µm) | 26.6 | 26.4 | 26.3 | 27.6 |
| | R3 (µm) | 30.9 | 31.5 | 30.7 | 33.8 |
| Performance parameters of a fiber | Numerical aperture | 0.199 | 0.204 | 0.209 | 0.202 |
| | DMD Inner Mask @850 nm (ps/m) | 0.10 | 0.06 | 0.08 | 0.07 |
| | DMD Outer Mask @850 nm (ps/m) | 0.11 | 0.01 | 0.09 | 0.09 |
| | DMD Interval Mask @850 nm (ps/m) | 0.08 | 0.09 | 0.07 | 0.05 |
| | Over-filled launch bandwidth @850 nm (MHz-km) | 5462 | 6722 | 4850 | 5835 |
| | Over-filled launch bandwidth @950 nm (MHz-km) | 3426 | 3156 | 3010 | 3821 |
| | Over-filled launch bandwidth @1300 nm (MHz-km) | 682 | 609 | 584 | 645 |
| | Effective modal bandwidth @850 nm (MHz-km) | 5025 | 4854 | 6153 | 5560 |
| | Effective modal bandwidth @875 nm (MHz-km) | 9312 | 8752 | 9795 | 7652 |
| | Effective modal bandwidth @900 nm (MHz-km) | 9262 | 8950 | 10571 | 7265 |
| | Effective modal bandwidth @925 nm (MHz-km) | 5868 | 4876 | 5627 | 5249 |
| | Effective modal bandwidth @950 nm (MHz-km) | 3078 | 2682 | 3126 | 2893 |
| | Macrobending additional loss caused by bending the fiber into two circles with a radius of 7.5 mm @850 nm (dB) | 0.09 | 0.06 | 0.05 | 0.04 |

TABLE 1-continued

Main structural parameters and performance parameters of a fiber

| | Embodiments | | | |
|---|---|---|---|---|
| | 1 | 2 | 3 | 4 |
| Macrobending additional loss caused by bending the fiber into two circles with the bending radius of 7.5 mm @1300 nm (dB) | 0.28 | 0.26 | 0.25 | 0.21 |

What is claimed is:

1. A high-bandwidth bend-insensitive multimode fiber, comprising a core layer and a cladding which comprises an inner cladding, a depressed cladding, and an outer cladding arranged sequentially from inside to outside, wherein the core layer has a refractive index profile in a shape of a parabola, a distribution index a in a range of 2.0 to 2.3, a radius R1 in a range of 23 μm to 27 μm, and a maximum relative refractive index difference $\Delta 1_{max}$ in a range of 0.9% to 1.2% at a center of the core layer, and the core layer is a silicon dioxide glass layer co-doped with germanium Ge, phosphorus P, and fluorine F, wherein P and Ge are used as positive dopants; a contribution amount of P at the center of the core layer, ΔP0, is in a range of 0.01% to 0.30%; a contribution amount of P at a boundary of the core layer and the inner cladding, ΔP1, is in a range of 0.01% to 0.30%; a difference between the contribution amount of P at the center of the core layer and the contribution amount of P at an edge of the core layer is ΔP10, and $$\Delta P10 = 2\left|\frac{\Delta P1 - \Delta P0}{\Delta P1 + \Delta P0}\right|,$$

ΔP10 being less than or equal to 5%; and a content of P at the center of the core layer is consistent with a content of P at the edge of the core layer, and wherein F is used as a negative dopant; a doping amount of F increases from the center of the core layer to the edge of the core layer; and a contribution amount of F at the center of the core layer, ΔF0, is in a range of 0.0% to −0.1%, and a contribution amount of F at the edge of the core layer, ΔF1, is in a range of −0.40% to −0.20%,
wherein the inner cladding is a silicon dioxide glass layer co-doped with phosphorus P and fluorine F, wherein a contribution amount of doping of F, ΔF2, is in a range of −0.18% to −0.08%; a contribution amount of P at an outer edge of the inner cladding, ΔP2, is in a range of 0% to 0.40%; and a difference between the contribution amount of P at the boundary of the core layer and the inner cladding and the contribution amount of P at the outer edge of the inner cladding is ΔP21, and ΔP21=ΔP2−ΔP1, ΔP21 being in a range of −0.3% to −0.01% or in a range of 0.01% to 0.20%.

2. The high-bandwidth bend-insensitive multimode fiber according to claim 1, wherein the inner cladding is divided into a platform area and a graded area from inside to outside according to variation of a concentration of P, wherein the concentration of P in the platform region remains substantially consistent, and then the concentration of P gradually increases or decreases, the platform area having a width T1 in a range of 0.1 μm to 2 μm, the graded area having a width T2 in a range of 2 μm to 4 μm; the inner cladding has a width (R2−R1) in a range of 1.0 μm to 5.0 μm; and the inner cladding has a relative refractive index difference Δ2, and Δ2=ΔP2+ΔF2, ΔF2 in the platform area and the graded area ensuring that Δ2 is in a range of −0.09% to 0.09%.

3. The high-bandwidth bend-insensitive multimode fiber according to claim 1, wherein the depressed cladding has a width (R3−R2) in a range of 3.0 μm to 7.0 μm, and has a relative refractive index difference Δ3 in a range of −0.9% to −0.3%; and the outer cladding is a pure silicon dioxide glass layer.

4. The high-bandwidth bend-insensitive multimode fiber according to claim 1, wherein both a DMD inner mask (5 μm to 18 μm) and a DMD outer mask (0 μm to 23 μm) of the fiber are less than or equal to 0.33 ps/m; and a DMD interval mask of the fiber is less than or equal to 0.25 ps/m.

5. The high-bandwidth bend-insensitive multimode fiber according to claim 1, wherein the fiber has a numerical aperture in a range of 0.185 to 0.215.

6. The high-bandwidth bend-insensitive multimode fiber according to claim 1, wherein the fiber has a bandwidth of 3500 MHz-km or more than 3500 MHz-km at a wavelength of 850 nm, has a bandwidth of 2000 MHz-km or more than 2000 MHz-km at a wavelength of 950 nm, and has a bandwidth of 500 MHz-km or more than 500 MHz-km at a wavelength of 1300 nm.

7. The high-bandwidth bend-insensitive multimode fiber according to claim 1, wherein the fiber has a bandwidth of 5000 MHz-km or more than 5000 MHz-km at a wavelength of 850 nm, has a bandwidth of 3300 MHz-km or more than 3000 MHz-km at a wavelength of 950 nm, and has a bandwidth of 600 MHz-km or more than 600 MHz-km at a wavelength of 1300 nm.

8. The high-bandwidth bend-insensitive multimode fiber according to claim 1, wherein the fiber has an effective modal bandwidth of 4700 MHz-km or more than 4700 MHz-km at a wavelength of 850 nm, has an effective modal bandwidth of 3400 MHz-km or more than 3400 MHz-km at a wavelength of 875 nm, has an effective modal bandwidth of 2900 MHz-km or more than 2900 MHz-km at a wavelength of 900 nm, has an effective modal bandwidth of 2800 MHz-km or more than 2800 MHz-km at a wavelength of 925 nm, and has an effective modal bandwidth of 2500 MHz-km or more than 2500 MHz-km at a wavelength of 950 nm.

9. The high-bandwidth bend-insensitive multimode fiber according to claim 1, wherein an additional bending loss of the fiber at a wavelength of 850 nm caused by bending the fiber into two circles with a bending radius of 7.5 mm is less than 0.2 dB; and additional bending loss of the fiber at a wavelength of 1300 nm caused by bending the fiber into two circles with a bending radius of 7.5 mm is less than 0.5 dB.

* * * * *